UNITED STATES PATENT OFFICE.

ELIEL L. SHARPNECK, OF BAKERSFIELD, CALIFORNIA.

PLASTIC COMPOSITION.

1,379,053.   Specification of Letters Patent.   Patented May 24, 1921.

No Drawing.   Application filed August 12, 1920. Serial No. 402,994.

*To all whom it may concern:*

Be it known that I, ELIEL L. SHARPNECK, a citizen of the United States, residing at Bakersfield, in the county of Kern and State of California, have invented certain new and useful Improvements in Plastic Compositions, of which the following is a specification.

This invention relates to plastic compositions, and particularly to compositions to be used in paving roadways, streets, sidewalks, reservoir linings, building-blocks, and such other uses as the same may be applied to.

A further object is to provide an improved composition for these purposes, of such material that the asphaltum, which forms one of the main ingredients, will be rendered resistant to the action of sun heat, this feature adding greatly to durability and especially to the lasting quality of roadways.

A further object is to combine with the asphaltum a material which will prevent the asphalt from becoming soft or running in hot weather, this result to be accomplished without destroying the ductility or adhesive qualities of the asphalt.

A further object is to provide a composition which will be of such character that, by its use, roadways may be constructed at considerably less expense than the cost of concrete or other material ordinarily used for that purpose. Other objects will appear in the course of the following description:

This composition includes a finely divided filler which may consist of any soil, sand, earthy matter or mixture thereof, preferably and for most purposes, screened sand being used, to which a certain amount of Portland cement has been added. The filler is mixed with mineral asphaltum to which has been added a certain percentage of magnesium chlorid.

To prepare the above composition, the sand, if sand is used as a filler, is thoroughly screened so that the grains will be practically of uniform size and all coarse vegetable matter removed. This screened sand is then heated and thoroughly dried to remove moisture before being mixed. In mixing, the filler is heated to a temperature of 300 to 350 degrees F., and while in this heated condition and before the asphalt is mixed with it, there is added Portland cement. The mineral asphaltum (which has preferably 40 to 60 degrees penetration) is heated to the same temperature as the filler,—that is to say: 300 to 350 degrees F., and when the asphaltum has attained the proper temperature there is added to it a certain percentage of magnesium chlorid which throws the asphalt into a high state of effervescence which increases the volume of asphalt several times, the asphalt and filler being mixed while the asphalt is effervescing, and the mixing being continued until the mass is of a uniform black color, and while the mass is maintained at an approximate heat of 300 to 350 degrees F.

I do not wish to be limited to any particular proportions of the ingredients above called for, as these proportions will vary under different circumstances. With a screened sand filler, however, the best results are attained by using the materials in the following proportions:

| | |
|---|---|
| Screened sand filler | 86 per cent. |
| Asphaltum, 50 to 60 degrees penetration | 8 per cent. |
| Portland cement | 5 per cent. |
| Magnesium chlorid | 1 per cent. |

For a filler consisting of earth, in which no sand is mixed, such as clay or other forms of like character, the proportions should be about as follows:

| | |
|---|---|
| Earth filler | 72.5 per cent. |
| Asphaltum | 20.0 per cent. |
| Portland cement | 5.0 per cent. |
| Magnesium chlorid | 2.5 per cent. |

It will be understood that these proportions are variable, particularly with regard to the proportions of filler to asphaltum. I have found in actual tests that a roadway may be constructed with this surface at a much lower cost than a roadway having a surface of concrete or other pavement formed in accordance with the ordinary formulas. It will also be noted that this mixture or composition is of particular value in that the asphalt is not acted upon to any disadvantage by the heat of the sun. At the same time, the whole mass is rendered impervious to water.

The heating of the filler and of the other ingredients to 300 or 350 degrees F. while being mixed and applied, is of great importance, since heating operates to remove a large percentage of air included within the mass; and thus when the mass is pressed into place by a roller, the particles will be forced into close contiguity with each other, and thus the density of the mass will be increased, rendering the resultant pavement very dense and hard.

What I claim is,—

1. A plastic composition comprising approximately 73 to 86 per cent. of a finely divided filler, 8 to 20 per cent. of mineral asphaltum, 1 to 2½ per cent. of magnesium chlorid and 5 per cent. of Portland cement.

2. A method of forming plastic compositions, which consists in mixing a finely divided filler and Portland cement together and heating to a temperature of 300 to 350 degrees F., also heating mineral asphaltum to a temperature of 300 to 350 degrees F. adding magnesium chlorid thereto, then mixing the asphaltum with the filler while the asphaltum is in a high state of effervescence and while the mass is maintained at a temperature of 300 to 350 degrees F.

In testimony whereof, I have affixed my signature in presence of two witnesses.

ELIEL L. SHARPNECK.

Witnesses:
HIRAM A. STURGES,
ARTHUR H. STURGES.